Dec. 13, 1949    B. L. MALLORY    2,490,974
SHOCK ABSORBER
Filed May 7, 1946    2 Sheets-Sheet 1

INVENTOR,
Bonnie L. Mallory
BY
Hull + West
ATTYS.

Dec. 13, 1949   B. L. MALLORY   2,490,974
SHOCK ABSORBER
Filed May 7, 1946   2 Sheets-Sheet 2
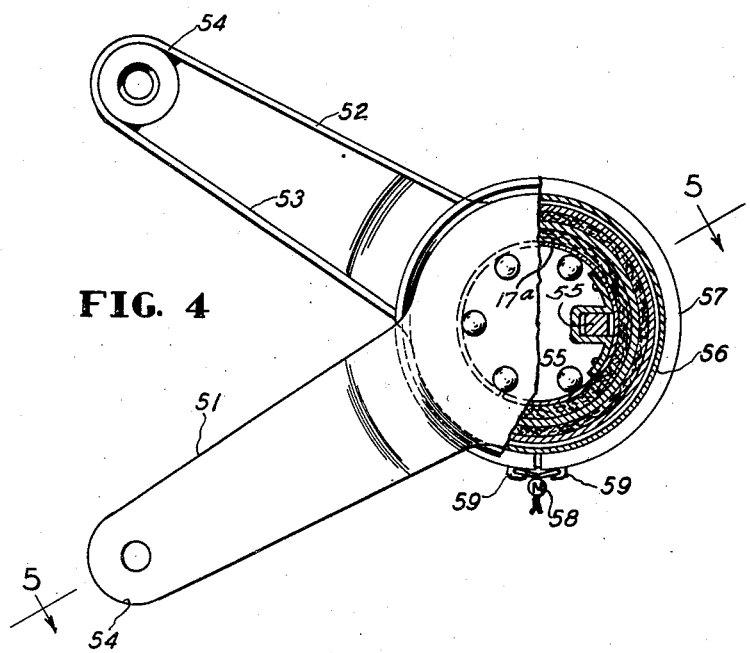
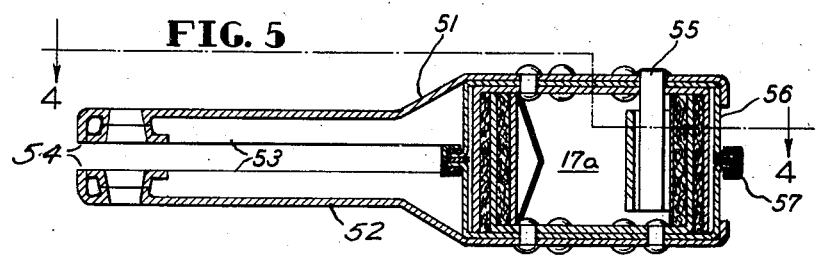
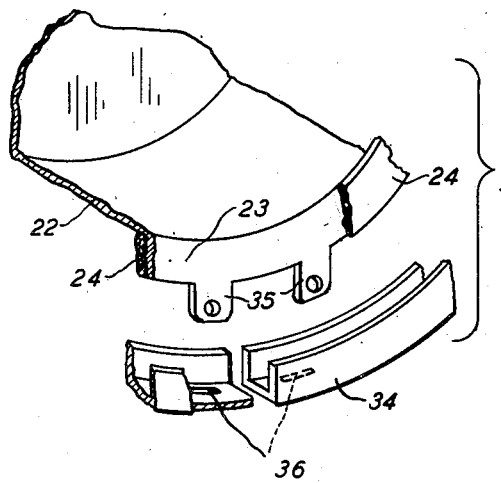
INVENTOR,
Bonnie L. Mallory
BY
Hull & West
ATTYS.

Patented Dec. 13, 1949

2,490,974

UNITED STATES PATENT OFFICE 2,490,974

SHOCK ABSORBER

Bonnie L. Mallory, Cleveland Heights, Ohio, assignor to The B. L. Mallory Company, Hazel Park, Mich., a corporation of Michigan Application May 7, 1946, Serial No. 667,748

13 Claims. (Cl. 188—130)

My present invention relates to improvements in shock absorbers of the general type disclosed in my Patents Nos. 2,408,985 and 2,437,749, issued, respectively, October 8, 1946 and March 16, 1948. Among the objects of the invention are those of providing a shock absorber of the friction type that is very smooth and silent of operation; that requires no lubrication; that is very durable and practically immune from disorder; that is capable of being manufactured at low cost; that does not require attention or adjustment after installation, and that, by the reversibility of one part, is adapted for use on either the right or left hand side of a vehicle.

Another object of the invention is to provide a seal around the operative parts of the shock absorber to prevent access of foreign matter thereto.

Another object of the invention is to provide an uncomplicated, compact shock absorber having a relatively large operative area.

Another object of the invention is to provide a friction type shock absorber which can be suspended between two relatively movable members.

Further and more limited objects of the invention are to provide a circumferentially split housing for a shock absorber and to seal such housing around the shock absorber; to provide a shock absorber mounting arm with a reenforced end connection; to provide a construction wherein the friction material of a shock absorber may be used to prevent entry of foreign material into the shock absorber; to provide an energizing band which completely contacts the surface of a layer of friction material and which has complementary cut end sections that overlap circumferentially; to position friction material between and in contact with cylindrical telescoped areas of two brake drums capable of eccentric relationship; and to use two substantially similar mounting arms for a shock absorber.

Figure 1:
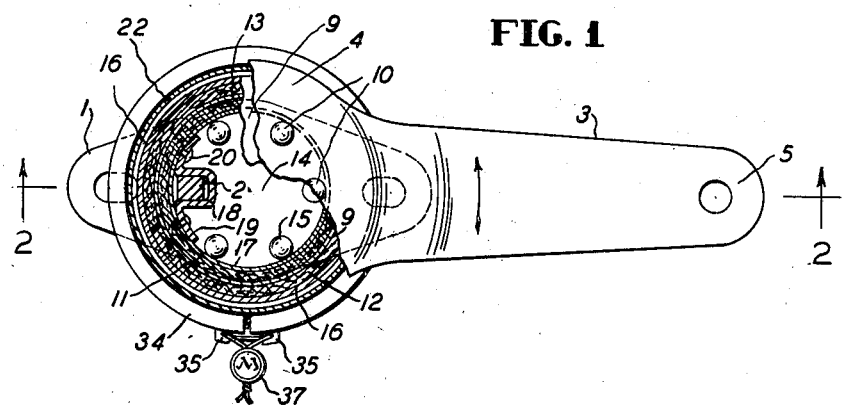
Figure 2:
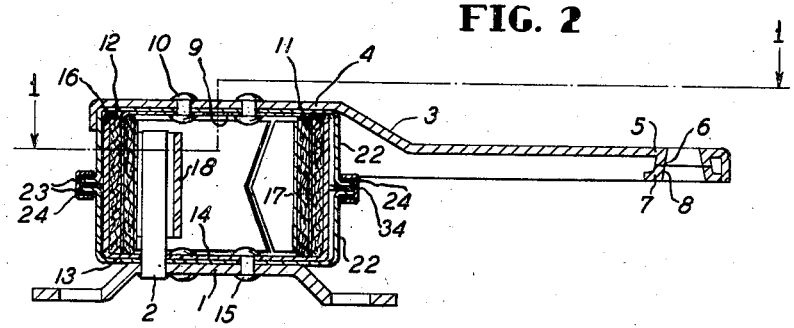
Figure 3:
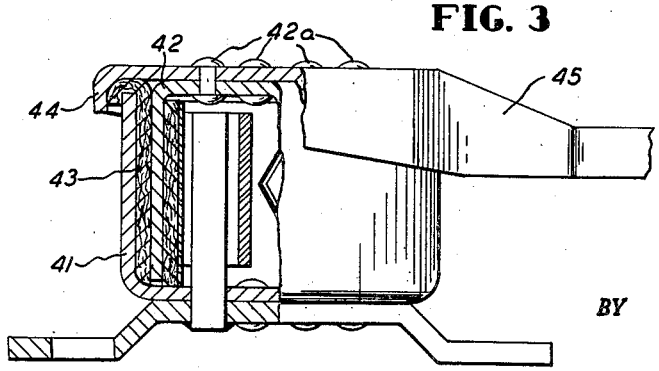

The foregoing objects and advantages, with others hereinafter appearing, are attained by the constructions illustrated in the accompanying drawings, wherein Fig. 1 is a vertical section taken on line 1—1 of Fig. 2 of a shock absorber embodying the principles of my invention; Fig. 2 is a horizontal section of the shock absorber taken on line 2—2 of Fig. 1; Fig. 3 is an enlarged fragmentary elevation, partly in section, of a modified type of a shock absorber seal of the invention; Fig. 4 is a section on line 4—4 of Fig. 5 of a modification of the invention; Fig. 5 is a section on line 5—5 of Fig. 4 with the second mounting arm rotated into register with the lower arm; and Fig. 6 is a fragmentary exploded view of the locking ring and associated means of the invention.

(Referring more specifically to the drawings, Fig. 1 shows a base, or mounting plate 1 that is adapted to be secured in the usual way to a vehicle, and a stud 2 is rigid with relation to the base 1 and may be secured thereto by a welded connection, as shown. The base 1 and stud 2, as well as the other structural parts of my improved shock absorber are preferably formed from suitable metals in a conventional manner.

A second mounting member, in this instance a continuous flange lever arm 3 having an enlarged shock absorber end 4 and a socket or connector end 5, is provided and it, of course, is for connection to a member which is relatively movable with relation to the part of the vehicle to which the base 1 is secured. The socket 5 of the arm 3 has a boss 6 formed thereon and a suitable metal disc 7 having a boss 8 thereon is secured, as by welding, to the socket 5 with the ends of the bosses 6 and 8 being abutted and in register to form a strong end connection for the arm 3. Note that the disc 7 is reenforced by the flange of the lever arm 3 for about one-half of its circumference.

A more or less cup-shaped brake drum 9 is secured in a conventional manner, as by rivets 10, to the lever arm 3 and it has inner and outer layers 11 and 12, respectively, of a suitable friction material lining in intimate contact with both surfaces of its cylindrical portion 13. Then a secondary brake drum 14, similar to the drum 9, is secured to the base 1, for example by rivets 15, and its cylindrical portion 16 is telescoped over the portion 13 so that adjacent but relatively movable cylindrical members are provided in the shock absorber. The respective diameters of the portions 13 and 16 and the thickness of the layer 12 are so correlated that the lining is tightly engaged between the outer surface of the portion 13 and the inner surface of the portion 16 and retards movement therebetween.

The primary snubbing action of my shock absorber is provided by the inner layer 11 of friction material. To this end, an energizing band 17, formed from a resilient strip of spring steel or other suitable material is positioned within the drum 9 and presses out against the layer 11 of friction material to force it against the portion 13 of the drum 9. The band 17 is transversely split to facilitate its action and I prefer to cut the band ends in the form of a V-shaped notch and complementary point as best shown in Fig. 2 of the drawings. Note that the ends of the band 17 are immediately adjacent each other and overlap circumferentially. Such construction practically eliminates bulging of the friction material between the ends of the band. The energizing band 17 carries a U-shaped member or clip 18 that fits over the stud 2, with respect to which it has slight radial movement only. The band is thus anchored against circumferential movement with respect to the drum 14 and base 1. The ends of the band 17 are appreciably unequally spaced from the member 18 and this permits the shock absorber to snub relative movement much more in one direction than in another, as explained more fully hereinafter. The member 18 has foot sections 19 that are shown as secured by rivets 20 to the band 17.

An especial feature of the invention is the provision of means for sealing the relatively movable parts against entry of dust or other foreign material so as to give the shock absorber the desired long life without any adjustment, cleaning, or repair. Two cup-shaped housing sections 22 are provided to encompass the brake drums 9 and 14 with one section being positioned between the lever arm 3 and the drum 9, and the remaining section being between the drum 14 and the base 1. The sections 22 are secured in place by the rivets 10 and 15. The open ends of the sections 22 face each other and are surrounded by radially outwardly extending flanges 23. Annular packing means 24 are positioned between the flanges 23, and on the outside of the flanges, and a split locking ring 34 of channel formation is contracted about said flanges 23 and packing means 24 to seal the ends of the sections 22 together whereby foreign material can not enter the shock absorber. Lugs 35 are formed on the periphery of the flange 23 of one of the housing sections 22 and project through slots 36 in the web of the locking ring 34. Said lugs have apertures through which a wire is engaged for the application of a seal 37 of lead or the like to prevent unauthorized persons from gaining access to the interior of the shock absorber without detection.

In operation, the layer 12 of friction material will retard relative movement of the drums 9 and 14 in both directions, while the energizing band 17, on counter-clockwise movement of the drum 9 relative to the stud 2, as indicated by the arrow in Fig. 1, will have appreciably less snubbing action than on clockwise movement of said drum relative to the stud. This is due to the uneven mounting of the band 17 since pressure between the less effective shorter end of the band and the layer 11 is increased during counter-clockwise movement and pressure between the longer end of the band and said layer is materially increased during clockwise movement of the drum. This differential action is a characteristic of the shock absorbers disclosed in my aforesaid patents, and in my earlier Patent No. 2,326,665, dated Aug. 10, 1943. When the shock absorber is under load, so to speak—that is, when the longer end of the energizing band is effective to snub the rebound action—the inner drum 9 tends to assume eccentric relationship to the outer drum 14 and thus compress a substantial area of the layer 12 of friction material between the peripheral walls of the drums, and this condition contributes materially to the effectiveness of the shock absorber.

The shock absorber shown in Fig. 3 is generally similar to the previously described embodiment of the invention and includes cup-shaped brake drums 41 and 42 that are telescoped together and have a layer 43 of friction material therebetween. The exposed edge of such material is bent back around the edge of the drum 41 and held thereagainst by the flange 44 of a mounting arm 45 to which the brake drum 42 is secured by rivets 42a. The edge or end of the brake drum 41 holds the friction material against the arm 45 while the flange 44 extends around substantially the entire periphery of the brake drum 41 to hold the friction material in place Thus an effective seal is provided without use of a metal housing as shown in Figs 1 and 2.

In the embodiment of the invention shown in Figs. 4 and 5, two substantially similar mounting arms 51 and 52 are provided for the shock absorber so that it can be suspended, through connections with the outer ends of said arms, between relatively movable members, such as the chassis and axle of a vehicle. The arms have inwardly extending continuous flanges 53 formed at their edges and are gradually tapered from the shock absorber mounting ends to the connector ends 54 thereof. The shock absorber proper is constructed the same as that of Figs. 1 and 2 with a stud 55 secured to the arm 51 and extending into the brake drums to function as a positioning member for the energizing band 17—a. A sectional housing 56 encases the present shock absorber with a locking ring 57 contracted around the flanges of the housing sections to close it tightly. Lugs 59 on one of the housing sections extend through slots in the ring 57 and a seal 58 is wired thereto to complete the shock absorber.

From the foregoing description, it will be seen that a sealed type of shock absorber has been provided, which seal may be obtained by either of the two constructions shown, respectively, in Fig. 3 and in the remaining views. The shock absorber may be positioned in spaced relation to relatively movable members as provided for in Figs. 4 and 5 or it may be carried by one of such members and connected to the other member according to the provisions of Figs. 1 to 3. Also it is obvious that by simply reversing the position of the energizing band with respect to the stud to which it is anchored, the absorber is converted from a right to a left hand unit, or vice versa.

While presently preferred embodiments of my invention have been illustrated and described in detail, it will be understood that the scope of the invention is not limited to the forms and details disclosed herein but is commensurate with the breadth of the appended claims.

Having thus described my invention, what I claim is:

1. In a friction type shock absorber, two cup-shaped brake drums each consisting of a cylindrical peripheral wall and a circular base section, said drums being positioned in fully telescoped relation with their base sections in opposed relation to each other to form an enclosed chamber, a mounting member secured to each of said brake drums, friction material tightly positioned between the adjacent surfaces of the peripheral walls of said brake drums, and differential action friction means positioned within and bearing outwardly against said inner brake drum.

2. A friction type shock absorber comprising two brake drums positioned in telescoped relation, friction material positioned tightly between and engaged by the adjacent surfaces of said brake drums and on the inner surface of the inner of said drums, said brake drums being adapted to be attached separately to relatively movable members, a resilient energizing band confined within the inner of said drums and forcing said friction material within said brake drum thereagainst, a stud adapted to be attached to one of the relatively movable members and extending into the interior of the inner of said brake drums, and means for securing said energizing band to said stud with uneven lengths of band extending therefrom whereby said friction material between said brake drums can be used to give a desired stiffness to the shock absorber and differential snubbing action can be obtained through the action of said band on oppositely directed relative movement between the movable members to which the shock absorber is secured.

3. A friction type shock absorber comprising two brake drums positioned in telescoped relation, friction material positioned tightly between the adjacent surfaces of said brake drums and on the inner surface of the inner of said drums, said brake drums being adapted to be attached separately to relatively movable members, a resilient energizing band confined within the inner of said drums and forcing said friction material thereagainst, a stud adapted to be attached to one of the relatively movable members and extending into the interior of the inner of said brake drums, means for securing said energiing band to said stud with uneven lengths of band extending therefrom, and means for sealing said brake drums to prevent entry of foreign material thereinto or therebetween.

4. A friction type shock absorber comprising two brake drums positioned in telescoped relation, friction material positioned tightly between the adjacent surfaces of said brake drums and on the inner surface of the inner of said drums, said brake drums being adapted to be attached separately to relatively movable members, a transversely split resilient energizing band confined within the inner of said drums and forcing said friction material thereagainst, a stud adapted to be attached to one of the relatively movable members and extending into the interior of the inner of said brake drums, means for securing said energizing band to said stud with uneven lengths of band extending therefrom, and housing means enclosing said brake drums to prevent entry of foreign material.

5. A friction type shock absorber comprising a mounting plate for engagement with a member, a stud secured to said plate and extending normally therefrom, a mounting member for attachment to a member movable with relation to the member carrying said mounting plate, a brake drum secured to said mounting member, friction means associated with both the inner and outer surfaces of said brake drum, a confining brake drum secured to said mounting plate and compressing said friction means on the outer surface of said brake drum, a resilient energizing band positioned within said brake drum, means for securing said band to said stud with the ends of said band being appreciably different distances from said stud, and a circumferentially split housing positioned around said confining brake drum and the means therein intermediate said brake drums and said mounting plate and member.

6. A friction type shock absorber comprising a mounting plate for engagement with a member, a stud secured to said plate and extending normally therefrom, a mounting member for attachment to a member movable with relation to the member carrying said mounting plate, a brake drum secured to said mounting member, layers of friction material associated with both the inner and outer surfaces of said brake drum, a confining brake drum secured to said mounting plate and encompassing said friction material on the outer surface of said brake drum, a transversely split resilient energizing band positioned within said layer of friction material carried on the inner surface of said brake drum, means for securing said band to said stud with the ends of said band being appreciably different distances from said stud, a circumferentially split housing having radially outwardly extending abutted flanges formed on its adjacent edges positioned around said confining brake drum intermediate same and said mounting plate and member, and means for engaging with said flanges to form a seal around said confining brake drum.

7. A friction type shock absorber comprising a mounting plate for engagement with a member, a stud secured to said plate and extending normally therefrom, a mounting member for attachment to a member movable with relation to the member carrying said mounting plate, a brake drum secured to said mounting member, friction material associated with both the inner and outer surfaces of said brake drum, a confining brake drum secured to said mounting plate and encompassing said friction material on the outer surface of said brake drum, a transversely split resilient energizing band positioned within said brake drum and contacting the friction material therein to urge it into engagement with said brake drum, means for securing said band to said stud with the ends of said band being appreciably different circumferential distances from said stud to produce differential action on opposite relative movements of said mounting plate and said mounting member, a circumferentially split housing having radially outwardly extending abutted flanges formed on its adjacent edges positioned around said confining brake drum and the means therein intermediate same and said mounting plate and member, annular packing means associated with said flanges, and a locking ring for engaging with said flanges and said packing means to form a seal around said confining brake drum.

8. In a shock absorber, a brake drum, friction type brake means positioned within said drum, two cup-shaped housing members having radially outwardly extending flanges formed at their lips, said housing members being positioned around said brake drum to enclose same and having their flanges in adjacent relation, annular packing means positioned between and on the axially outer surfaces of said flanges, a transversely split locking ring secured over and extending around said flanges and packing means to secure them together and form a seal around said drum, and means for locking the sections of said ring together.

9. In a shock absorber, two supporting members adapted to be attached to relatively movable objects, a brake drum secured to each of said supporting members, friction type brake means associated with said drums, two cup-shaped housing members having radially outwardly extending flanges formed at their lips, said housing members being positioned around said brake drums to enclose same and having their flanges in adjacent relation, packing means associated with said flanges, and a locking ring secured over and extending around said flanges and packing means to secure them together and form a seal around said drums.

10. In a shock absorber, a brake drum, two supporting arms adapted to be attached at one end to relatively movable objects, friction type brake means positioned within said drum, two cup-shaped housing members having radially outwardly extending flanges formed at their lips, said housing members being positioned around said brake drum to enclose same, and having their flanges in adjacent relation, annular packing means positioned between and on the axially outer surfaces of said flanges, a transversely split locking ring secured over and extending around said flanges and packing means to secure them together and form a seal around said drum, and means for locking the sections of said ring together.

11. In a friction type shock absorber, two cup-shaped brake drums positioned in telescoped relation with their base sections being in opposed relation to form an enclosed chamber, a mounting member secured to the inner of said brake drums and extending outwardly at least to the periphery of said outer brake drum, and friction material tightly positioned between the adjacent surfaces of said brake drums, said friction material being folded back over the edge of said outer brake drum and being held against said mounting member by the end of said outer brake drum to form a seal for the shock absorber.

12. In a friction type shock absorber, two cup-shaped brake drums positioned in telescoped relation with their base sections being in opposed relation to form an enclosed chamber, a flanged mounting member secured to the inner of said brake drums and having its flange positioned adjacent to and following the periphery of said outer brake drum for a substantial distance, and friction material tightly positioned between the adjacent surfaces of said brake drums, said friction material being folded back over the edge of said outer brake drum and being held against said mounting member by the end of said outer brake drum and being held against the outer surface of said outer brake drum by the flange on said mounting member to form a seal for the shock absorber.

13. A friction type shock absorber comprising a mounting arm for attachment to a member, a stud secured to said arm and extending normally therefrom, a second mounting arm for attachment to a second member movable with relation to the first mentioned member, a brake drum secured to the second mounting arm, friction means associated with both the inner and outer surfaces of said brake drum, a confining brake drum secured to the first mentioned mounting arm and compressing said friction means on the outer surface of said brake drum, a resilient energizing band positioned within said brake drum, means for securing said band to said stud with the ends of said band being appreciably different distances from said stud, and a circumferentially split housing positioned around said confining brake drum and the means therein intermediate said brake drums and said mounting arms.

BONNIE L. MALLORY.

REFERENCES CITED

The following references are of record in the file of this patent:

UNITED STATES PATENTS

| Number | Name | Date |
| --- | --- | --- |
| 1,041,276 | Hart | Oct. 15, 1912 |
| 1,080,630 | Hartford | Dec. 9, 1913 |
| 1,592,167 | Webster | July 13, 1926 |
| 1,830,418 | Armstrong | Nov. 3, 1931 |
| 1,843,855 | Watson | Feb. 2, 1932 |
| 1,911,459 | Mitchell | May 30, 1933 |
| 1,963,654 | Farkas | June 19, 1934 |

FOREIGN PATENTS

| Number | Country | Date |
| --- | --- | --- |
| 284,739 | Italy | Apr. 22, 1931 |